(12) United States Patent
Fujiwara

(10) Patent No.: US 6,950,938 B1
(45) Date of Patent: Sep. 27, 2005

(54) SERVICE IDENTIFICATION TAG AND COMMUNICATIONS SYSTEM USING THE SAME

(75) Inventor: Ryuhei Fujiwara, Tokyo (JP)

(73) Assignee: NEC Corporation, Tokyo (JP)

( * ) Notice: Subject to any disclaimer, the term of this patent is extended or adjusted under 35 U.S.C. 154(b) by 977 days.

(21) Appl. No.: 09/684,334

(22) Filed: Oct. 10, 2000

(30) Foreign Application Priority Data

Oct. 15, 1999 (JP) .......................................... 11-293329

(51) Int. Cl.[7] .......................... H04L 9/00; H04N 7/167
(52) U.S. Cl. .................. 713/182; 713/176; 713/179; 713/186; 713/201; 380/202; 380/216; 705/58; 705/62
(58) Field of Search ............................... 713/182, 176, 713/201, 179, 186, 181; 380/202, 203, 216, 280; 705/58, 62; 379/93.02; 708/135

(56) References Cited

U.S. PATENT DOCUMENTS

| | | | | |
|---|---|---|---|---|
| 5,640,193 A | * | 6/1997 | Wellner ........................ | 725/100 |
| 5,930,767 A | * | 7/1999 | Reber et al. .................. | 705/26 |
| 5,938,726 A | * | 8/1999 | Reber et al. ................. | 709/217 |
| 5,940,595 A | * | 8/1999 | Reber et al. ................. | 709/227 |
| 5,978,773 A | * | 11/1999 | Hudetz et al. ................ | 705/23 |
| 5,986,651 A | * | 11/1999 | Reber et al. ................. | 345/738 |
| 5,995,105 A | * | 11/1999 | Reber et al. ................. | 345/835 |
| 6,081,827 A | * | 6/2000 | Reber et al. ................. | 709/200 |
| 6,148,331 A | * | 11/2000 | Parry .......................... | 709/218 |

FOREIGN PATENT DOCUMENTS

| | | |
|---|---|---|
| JP | 8-132768 | 5/1996 |
| JP | 8-310167 | 11/1996 |
| JP | 9-204389 | 8/1997 |
| JP | 10-78928 | 3/1998 |
| JP | 11-66053 | 3/1999 |
| JP | 11-259491 | 9/1999 |
| JP | 11-277961 | 10/1999 |
| JP | 2000-172802 | 6/2000 |
| JP | 2001-101232 | 4/2001 |

* cited by examiner

Primary Examiner—Kambiz Zand
(74) Attorney, Agent, or Firm—Foley & Lardner LLP

(57) ABSTRACT

Disclosed is a service identification tag for being used in accessing an information transmission server on the Internet. The tag is formed combining an exclusive graphic pattern that can be recognized by a human, and an identification code that can be read by a reading unit. Also disclosed is a communications system having: a service server provided with an identification code/URL conversion table; an information transmission server provided with an information storage; and a terminal unit that is connected through a radio or wire communication network to the information transmission server, the terminal unit having a function for communicating with a Web server. The terminal unit makes a unique link to the service server, reads the identification code from a service identification tag, sends the identification code to the service server, and receives the URL information of the information transmission server corresponding to the identification code from service server.

3 Claims, 3 Drawing Sheets

SERVICE IDENTIFICATION TAG AND COMMUNICATIONS SYSTEM USING THE SAME

FIELD OF THE INVENTION

This invention relates to a service identification tag and a communications system using the service identification tag.

BACKGROUND OF THE INVENTION

On the Internet, each information-processing unit (server) has a specific IP (Internet protocol) address (accessed party information). In accessing or communicating with another information-processing unit, location of the information processing unit on the computer network is specified on the IP address. The IP address is a TCP/IP protocol address, and is defined by a sequence of network number and each (host) computer number, which are totally 32 bits in length. It is represented by four numbers with dots inserted therebetween, for example, 192. 244. 177. 11.

Also, through the WWW (world wide web), which is information search system (or service), using the Internet, the user can access variety of information based on URL (uniform resource locator).

The URL is represented by, for example, http://www.abc.co.jp. Of this URL, "http" represents protocol name and "www.abc.co.jp" represents host (server) name (domain name). Host name (domain name) is subject to conversion by a server called DNS (domain name server) built on the Internet.

Using the information-processing unit including a personal computer, the user inputs accessed party information, such as IP address and URL, that indicates the address of information to be accessed, while displaying and confirming letters to be input on the display by operating the keyboard or mouse located near the display.

Thus, in accessing a server or a homepage, it is necessary to input the IP address of the server or the URL of the homepage. So, the user needs to know the IP address (or domain name) of the server or the URL of the homepage. For this need, recently, issued are publications that describe the IP address and URL of servers and homepages on the Internet and are, in other words, equivalent to a telephone directory. The user can access a desired server or homepage by inputting the IP address or URL obtained by referring to such a publication.

However, when using IP address or URL that is described in the publication such as a newspaper etc., it is necessary for the user to input it by operating the keyboard. As described earlier, IP address is represented by a sequence of four numbers with dots inserted therebetween, and URL is represented by at least protocol name and domain name. Thus, to input such a long letter string by operating the keyboard is very burdensome.

Furthermore, for example, when the user actually accesses a desired homepage using the information-processing unit while referring to a publication described above, it is necessary to boot a viewer (WWW browser) that is an application for access to the homepage before inputting the URL. This is also burdensome.

To remove these drawbacks, Japanese published patent application No. 9-204389 (1997) suggests an information-processing unit (prior art 1). The information-processing unit comprises a receiving means for receiving accessed party information to be sent from a reading unit to read the accessed party information described in a publication, and a control means for giving the accessed party information to an application for accessing information and controlling the application to access the information based on the accessed party information received by the receiving means.

In detail, in prior art above, the reading unit reads a bar code corresponding to URL and the URL concerned is then transmitted to the computer. When the computer receives the URL, the viewer is booted and the URL is given to the viewer so as to access a corresponding homepage. Thus, prior art 1 can offer easy access to the homepage.

Japanese published patent application No. 10.78928 (1998) discloses a system for accessing the Internet. In this system, in accessing the Internet using URL for access to information sources located on the network from an access unit such as a PC, computer, a computer game device and home electronic appliances, a 10-digit number relatively short is in advance assigned to the URL being represented by a letter string, to the first upper digit and the second to fifth upper digits, arbitrary numerals are assigned based on a correspondence table of numeral corresponding to alphabet and reference value and a correspondence table of alphabet to digit number which are prepared in advance. Further, according to need, in like manner, arbitrary numerals are assigned to the sixth, seventh and eighth to tenth upper digits. Thus, without being aware of the long and complex letter string URL, the user can access the Internet only by inputting the relatively short number corresponding to the URL. Furthermore, the access data can be also used as statistical processing information.

However, in prior art 1, although using the bar code and graphic pattern as URL identifying information is disclosed, converting them into URL by a server and then returning them to the client and making the user identify them using a mark are not disclosed.

In prior art 2, only assigning the number, instead of the graphic pattern or bar code, to each URL and then converting it into URL are disclosed.

Meanwhile, bar codes have been used in logistics, but its use or meaning is known only among the dealers and is not known among ordinary users.

SUMMARY OF THE INVENTION

Accordingly, it is an object of the invention to provide a service identification tag, a communications system and an information service system that allow possible users of a service to easily recognize the presence of the service.

According to the invention, a service identification tag for being used in accessing an information transmission server on the Internet, comprises:

an exclusive graphic pattern that can be recognized by a human; and an identification code that can be read by a reading unit.

According to another aspect of the invention, a communications system, comprises:

a service server provided with an identification code/URL conversion table;

an information transmission server provided with an information storage; and a terminal unit that is connected through a radio or wire communication network to the information transmission server, the terminal unit having a function for communicating with a Web server;

wherein the terminal unit makes a unique link to the service server to be predetermined, reads an identification code from a service identification tag that is composed of an exclusive graphic pattern that can be recognized by a human and the identification code that can be read by a reading unit, sends the identification code to the service server, and receives the URL information of the information transmission server corresponding to the identification code from service server.

According to another aspect of the invention, an information service system, comprises:

means for using a service identification tag that is composed of an exclusive graphic pattern that can be recognized by a human and an identification code that can be read by a reading unit;

wherein the information service system provides a service server that converts the identification code into URL information, conducts the centralized management of the identification code, and guarantees the exclusive use of the identification code relating to URL of an information transmitter who requests the service of the information service system and the exclusive use of the graphic pattern.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
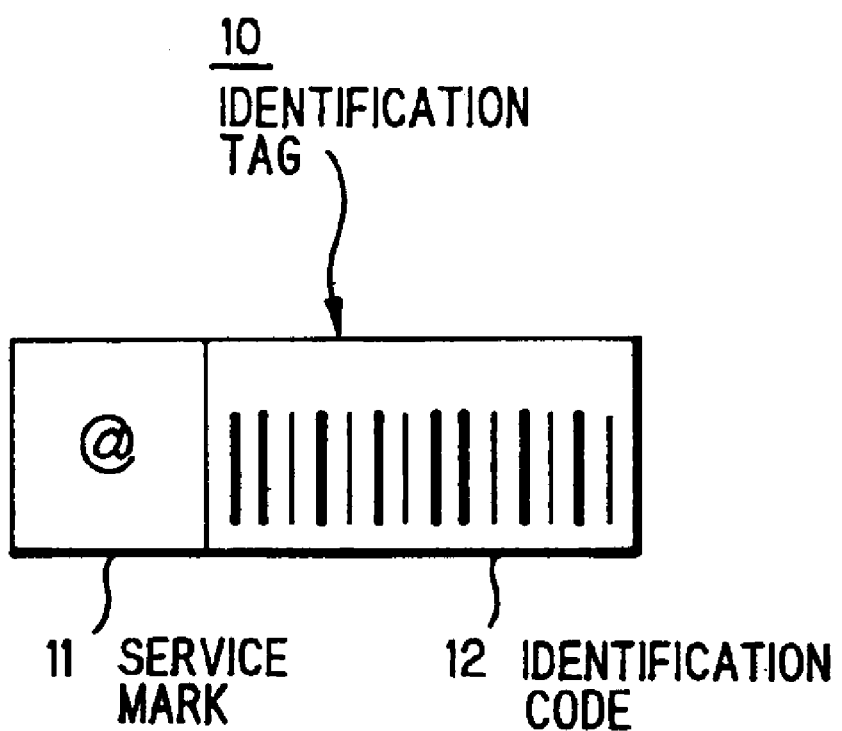
FIG. 1 is a plan view showing a service identification tag in a preferred embodiment according to the invention.

The preferred embodiments of the invention will be explained below, referring to the drawings.

FIG. 1 is a plan view showing a service identification tag in the preferred embodiment according to the invention.

In FIG. 1, reference numeral 10 indicates the service identification tag of the invention. The service identification tag 10 is formed by combining an exclusive service mark 11 that can be identified by a human such as consumer, dealer and other users, for example, one being set to be a registered trademark, and an identification code 12 such as a bar code.

Those who know the presence of the service find the service mark 11 in the service identification tag 10, thereby they can know that part of the bar code to follow the service mark 11 is the identification code 12 of that service.

An example of the use of a service system of the invention that the service identification tag 10 and a server system are combined is explained below.

Figure 2:
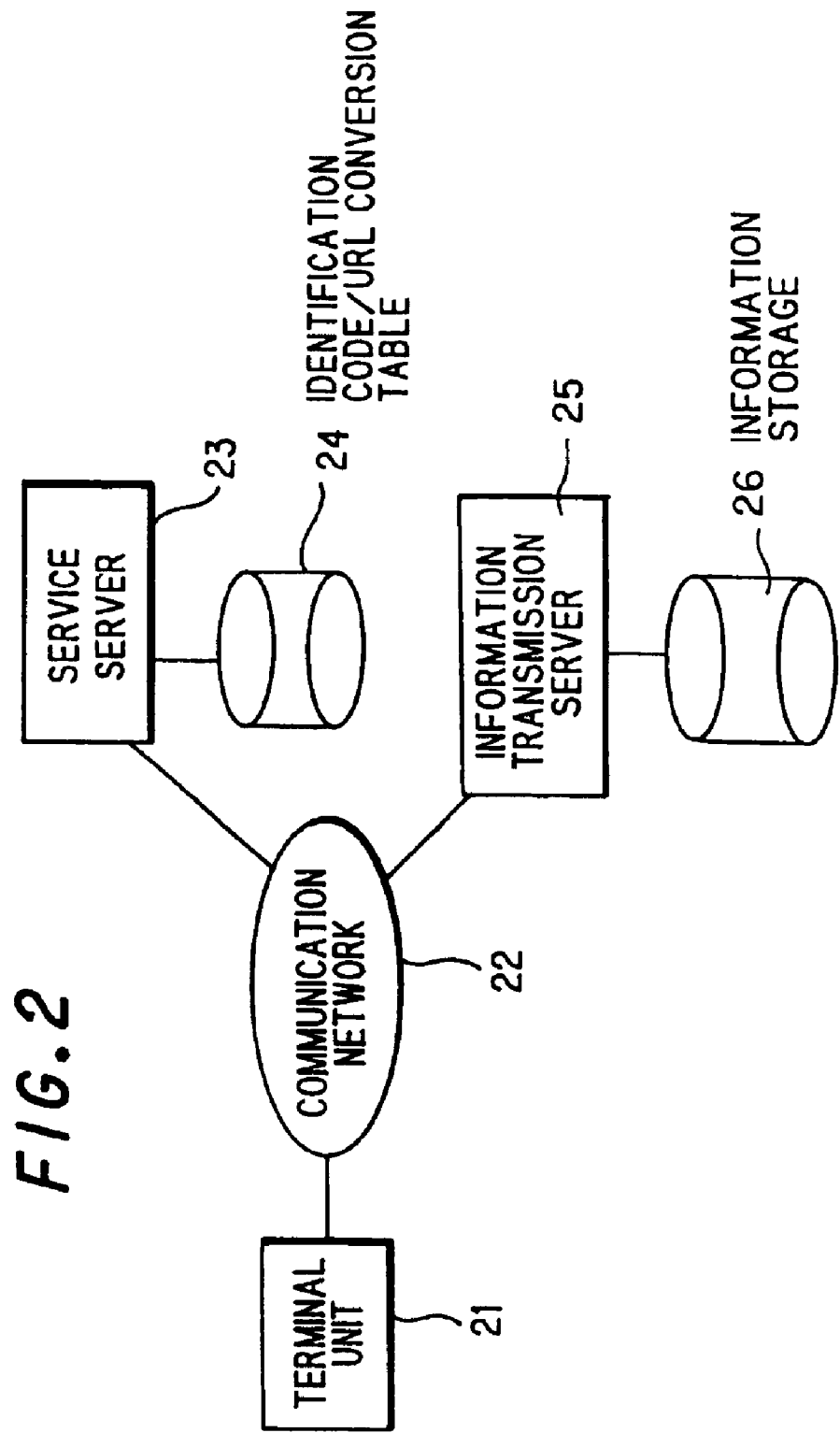
FIG. 2 is a block diagram showing the composition of a communication service system in a preferred embodiment of the invention using the service identification tag in FIG. 1.
Figure 3:
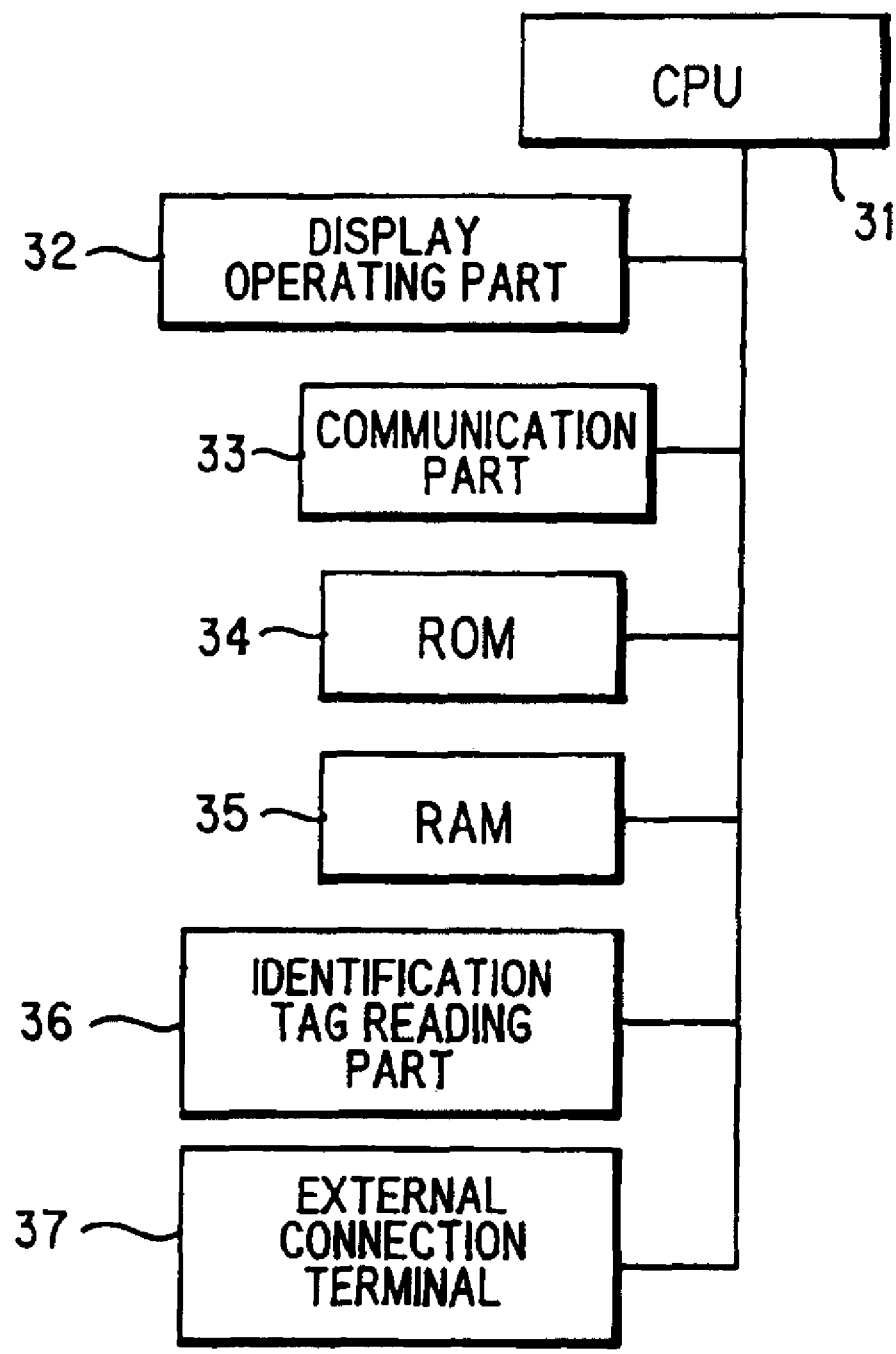
FIG. 3 is a block diagram showing an example of the composition of a terminal unit used for the communication service system in FIG. 2.

FIG. 2 is a block diagram showing the composition of a system that uses the service identification tag 10. FIG. 3 is a block diagram showing an example of the composition of a terminal unit 21 in FIG. 2.

In FIG. 2, the terminal unit 21 is connected through a communication network 22 formed by ISDN lines to a service server and an information transmission server 25. The service server 23 is provided with an identification code/URL conversion table 24. Also, the information transmission server 25 is provided with an information storage 26.

The terminal unit 21 is, as shown in FIG. 3, composed of CPU 31, display operating part 32, communication part 33, ROM 34, RAM 35, identification tag reading part 36 and external connection terminal 37. The respective parts, display operating part 32 to external connection terminal 37, are connected to the CPU 31 and are properly controlled by the CPU 31.

Referring to FIGS. 2 and 3, the service provider who holds the service mark as registered trademark assigns an identification code uniquely to each URL of information transmitter who demands the service, and guarantees the exclusiveness. Also, the service provider manages the service server 23, which has the identification code/URL conversion table 24, to supply the URL information corresponding to identification code information to be sent from the terminal unit 21.

Also, the service provider supplies users who intend to get information from the service with the terminal unit 21. The terminal unit 21 is equipped with the identification tag reading part 36 with the function for reading the identification code 12 of the service identification tag 10, the communication part 33 with the communication function by radio or ISDN line, and a mechanism for identifying the server 23 to supply URL information corresponding to especially the identification code 12.

The server identifying mechanism is, for example, a mechanism that, with the identification code 12 including a code to specify the server and with the ROM 34 of the terminal unit 21 storing telephone number corresponding to that code, the CPU 31 drives the communication part 33 so as to automatically call the service server 23 to connect the line to the service server 23.

Further, by providing the CPU 31 with a function for conducting the pattern recognition of the service mark 11 that allows the service to be identified, the exclusivity or sharing ability of that service can be enhanced. Namely, by switching specific information to be given to the mechanism for specify the URL information supplying server (service server) according to the pattern recognition of the service mark 11, multiple servers can be used selectively. When the concerned server is not registered, the use of service itself can be restricted.

Also, by enhancing precision in pattern recognition of the CPU 31, the forgery of trademark can be analyzed. Therefore, the exclusiveness of the service can be further guaranteed.

The terminal unit 21 can make a communication link to the information transmission server holding URL to be obtained from the service server, downloading information stored in the memory 26 from the information transmission server 25 through the communication, displaying it using the display operating part 32, further forwarding the information to other terminal units through the external connection terminal 37.

When the communication part 33 of the terminal unit 21 is provided with a radio communication function, the mobility of the unit can be further enhanced.

A detailed example of the embodiment will be explained below.

For example when the seal-like service identification tag 10 is attached to the case of an audio CD, the user finds the service mark (registered trademark) 11 in the service identification tag 10, and then presses down an operation button (not shown) on the display operating part 32 while pressing the identification tag reading part 36 of the terminal unit 21 against the service identification tag 10.

The terminal unit 21 first reads the service mark 11 and the identification code 12 in the service identification tag 10, and conducts the pattern recognition of the service mark 11. When the pattern coincides with an existing pattern stored in the ROM 34, it makes a call to a telephone number that is in advance stored in the RAM 34 corresponding to that pattern.

The call is linked to the service server 23 in FIG.2, and then the server sends back a response.

At this time, the terminal unit 21 converts the identification code 12, which is read previously, into a text code, and then sends it to the service server 23, thereby requesting the corresponding URL information. The service server 23 sends the terminal unit 21 the URL information of the information transmission server 25 corresponding to the identification code 12 while reading the URL information from the identification code/URL conversion table 24.

After the terminal unit 21 receives the URL information, it disconnects the link to the service server 23, again making a link to the information transmission server 25 (e.g., in case of audio CD, a recording company) located at the URL received, requesting information stored in the information storage 26. The information, such as history of musician, to be sent from the information transmission server 25 to the terminal unit 21 is displayed on the display through the display operating part 32 of the terminal unit 21.

In another use, the service identification tag 10 may be printed in a catalogue for catalogue sales so that merchandise information and order-entry sheet can be sent to the users.

Advantages of the Invention:

Conventionally bar codes have been used in logistics, but its use or meaning is known only among the dealers and is not known among ordinary users. In contrast, in this invention, the service identification tag that a service mark to identify a service is added to a bar code allows people to know the presence of the service. The service identification tag can be made by printing, and seal-like one made by printing may be attached to products or the tag may be directly printed in the corner of a catalogue.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A communication system, comprising:
a plurality of service servers each provided with an identification code/URL conversion table;
a plurality of information transmission servers each provided with an information storage; and
a terminal unit that is connected through a radio or wire communication network to said information transmission servers, said terminal unit having a function for communicating with a Web server;
wherein said terminal unit makes a unique link to one of said service servers based on a pattern recognition performed on an exclusive graphic pattern that is a part of a service identification tag, reads an identification code from the service identification tag that is composed of said exclusive graphic pattern that is recognizable by a human and said identification code that can be read by a reading unit, sends the identification code to said one of said service servers and receives a URL information of one of said information transmission servers corresponding to the identification code from said one of said service servers, wherein said terminal unit includes:
a data storing part; and
an identification tag reading means for conducting a pattern recognition of said exclusive graphic pattern, and an automatic calling means for automatically making a call to said one of said service servers when said exclusive graphic pattern read by said identification tag reading means coincides with a graphic pattern that is stored in advance in said data storing part,
wherein, only after said terminal unit has initially contacted said one of said service servers when said exclusive graphic pattern read by said identification tag reading means coincides with said graphic pattern that is stored in advance in said data storing part, does said terminal unit convert said identification code to text code and output the text code to said one of said service servers, in order to request URL information of said one of said information transmission servers.

2. The communication system, according to claim 1, wherein:
said terminal unit makes a link to said one of said information transmission servers located at the URL received from said one of said service servers after disconnecting the link to said one of said service servers, and obtain information stored in the information storage of said one of said information transmission servers.

3. The communications system according to claim 1, wherein said terminal unit further comprises:
a graphic data storage unit for storing a plurality of graphics data respectively corresponding to a plurality of service marks, and a plurality of telephone numbers respectively corresponding to said plurality of service servers that store URL information for accessing at least one of said plurality of information transmission servers.

* * * * *